US00RE34342E

United States Patent [19]

Dammann

[11] E Patent Number: Re. 34,342

[45] Reissued Date of Patent: Aug. 17, 1993

[54] YARN FALSE TWIST CRIMPING MACHINE

[75] Inventor: Peter Dammann, Remscheid, Fed. Rep. of Germany

[73] Assignee: Barmag AG, Remscheid, Fed. Rep. of Germany

[21] Appl. No.: 477,222

[22] Filed: Feb. 7, 1990

Related U.S. Patent Documents

Reissue of:

[64] Patent No.: 4,809,494
Issued: Mar. 7, 1989
Appl. No.: 150,850
Filed: Feb. 1, 1988

[51] Int. Cl.[5] ..... D02G 1/02

[52] U.S. Cl. ..... 57/291; 57/352

[58] Field of Search ..... 57/279, 282, 284, 290, 57/291, 308, 352

[56] References Cited

U.S. PATENT DOCUMENTS

| | | | |
|---|---|---|---|
| 3,813,868 | 6/1974 | Lorenz . | |
| 3,971,200 | 7/1976 | Richter | 57/290 |
| 4,001,548 | 1/1977 | Bauer . | |
| 4,051,650 | 10/1977 | Gleyze et al. . | |
| 4,058,961 | 11/1977 | Kubler . | |
| 4,141,206 | 2/1979 | Eaves . | |
| 4,223,519 | 9/1980 | Konig et al. . | |
| 4,300,345 | 11/1981 | Kasai et al. | 57/284 X |
| 4,332,132 | 6/1982 | Bru et al. | 57/291 X |
| 4,362,011 | 12/1982 | Kikuchi . | |
| 4,389,841 | 6/1983 | Oberstrass . | |
| 4,572,458 | 2/1986 | Bluhm et al. . | |
| 4,581,884 | 4/1986 | Brough . | |
| 4,719,745 | 1/1988 | König | 57/291 |

FOREIGN PATENT DOCUMENTS

| | | |
|---|---|---|
| 1414276 | 11/1975 | United Kingdom . |
| 1471581 | 4/1977 | United Kingdom . |

*Primary Examiner*—Joseph J. Hail, III
*Attorney, Agent, or Firm*—Bell, Seltzer, Park & Gibson

[57] ABSTRACT

A false twist crimping machine is disclosed which is adapted for processing synthetic yarn, and which includes a novel [means] *structure* for the thermal treatment of a yarn at high processing speeds of 1,200 meters per minute and above, and without increasing the overall size of the machine. The yarn thermal treatment [means] *structure* includes a yarn heating plate and a yarn cooling plate. The yarn heating and cooling plates preferably each include a curved yarn path guideway to provide efficient and reliable yarn contact of the advancing yarn with the curved guiding surfaces, and at least the yarn cooling plate extends above a service aisle provided between the central frame of the false twist crimping machine and a yarn supply creel spaced from and extending parallel to the central frame. In one preferred embodiment, the yarn heating plate comprises two side-by-side vertically directed sections which are positioned near the floor next to the creel, with the yarn being guided serially along the two sections and then upwardly to the cooling plate which extends across and above the service aisle.

32 Claims, 5 Drawing Sheets

YARN FALSE TWIST CRIMPING MACHINE

Matter enclosed in heavy brackets [ ] appears in the original patent but forms no part of this reissue specification; matter printed in italics indicates the additions made by reissue.

FIELD OF THE INVENTION

This invention relates generally to a false twist crimping machine for processing synthetic yarn and in which a yarn supply creel extends parallel to and is spaced from the central frame to provide a service aisle between the creel and the central frame, and more particularly to an improved thermal treatment zone extending above the service aisle and defining a roof-like structure to provide effective and reliable contact of the advancing yarn with the heating and cooling plates so as to permit increased operating speeds without increasing the machine height.

BACKGROUND OF THE INVENTION

It is generally known to provide a yarn supply creel extending in spaced parallel relationship along a false twist crimping machine to define a service aisle between the creel and the central frame of the machine. It is also known to direct the yarns from the yarn supply packages on the creel and along a path of travel above the service aisle while directing the yarns over yarn heating and cooling plates with the yarn heating and/or cooling plates forming a roof-shaped structure so that the thermal treatment zone is lengthened for the purpose of increasing the yarn processing speed without unduly increasing the machine height. False twist crimping machines of this general type are disclosed in U.S. Pat. Nos. 4,141,206, 4,058,961, and 4,572,458.

The thermal treatment zones extending across the service aisles, as disclosed in these prior art patents, do not provide an adequate length for the heating and cooling of the yarn in order to further increase the yarn processing speeds to more than 1,200 meters per minute. In order to be able to increase the operating speeds to this level, it has been found that an adequate length of the thermal treatment zone can be achieved only when a reliable contact of the advancing yarn with the yarn heating plate and the yarn cooling plate is insured.

SUMMARY OF THE INVENTION

With the foregoing in mind, it is an object of the present invention to provide an improved thermal treatment zone in which the configuration and the positioning of the yarn heating plate and the yarn cooling plate have the longest possible effective contact length while maintaining substantially the same overall height of the machine.

In a preferred embodiment of the present invention, a yarn false twist crimping machine is provided which comprises a central frame, and a side frame laterally spaced from the central frame and defining a service aisle therebetween. The side frame is adapted for mounting yarn bobbins thereon, and a first yarn feeding means is mounted to the side frame. Yarn heating means is positioned adjacent the side frame and below the first yarn feeding means, and the heating means includes a downwardly directed guideway having an inlet end for receiving the yarn from the first yarn feeding means, and an outlet end. A deflecting yarn guide is positioned adjacent the outlet end, and an upwardly directed guideway is provided which has an inlet end adjacent the deflecting yarn guideway, and an outlet end. Also, yarn cooling means is provided which has an inlet end adjacent the outlet end of the upwardly directed guideway, and with the yarn cooling means extending across and above the service aisle. Yarn false twisting means is mounted to the central frame for receiving yarn from the outlet end of the yarn cooling means, and winding means is mounted to the central frame for winding the processed yarn.

In the above described embodiment, the overall length of the yarn heating means is shorter than the known types of yarn heating means. Specifically, in this arrangement the yarn heating means is provided with downwardly and upwardly directed yarn guideways so that the effective contact length of the heater is increased and the upper end of the yarn heating means does not extend substantially above the height of the creel so that a sufficient space is left for positioning the yarn cooling means above the service aisle.

The yarn cooling means is preferably in the form of one or more elongate plates. For example, the cooling means may comprise one elongate plate, which extends across and above the service aisle along a continuously curved path in the general shape of a cupola when viewed in cross section. In a further embodiment, the cooling means may be two plates which extend over the service aisle in the shape of a continuous curve, and the yarn guideways in each cooling plate may face away from the service aisle. In this arrangement, it is not absolutely necessary that the curvature be constant over the length of the yarn cooling means. Rather, it may be useful for the purpose of influencing the yarn tension in various areas of the yarn cooling means, to increase the curvature, especially in the exit area. This configuration provides that the yarn tension and force at which the yarn initially contacts the cooling means are substantially reduced to provide protection for the hot yarn.

It is also possible to make the cooling means in the form of upwardly inclined and downwardly inclined plates defining a peaked roof-like structure which extends across and above the service aisle. When the yarn guideway of at least one of the yarn cooling sections faces away from the service aisle and is concavely curved relative to the service aisle, the increased curvature minimizes the looping of the yarn about the deflecting yarn guide which is positioned between the two sections. A further reduction of the overall length of the yarn heating plate is also made possible in that the yarn heating plate is more curved than before, for example, with a radius of curvature of less than ten meters.

Another object of the present invention is to [reduce] *reduce* both the stress on the yarn and the twist stop effect at the yarn deflection points, while maintaining the necessary length of the thermal treatment zones. This is accomplished in an embodiment of the invention wherein the yarn heating plate and the yarn cooling plate are configured over the service aisle preferably in the shape of a curved roof or a cupola, and so that at least the yarn cooling plate forms an upwardly vaulted curve. In this arrangement, the yarn heating plate may be arranged to rise substantially vertically from the yarn supply creel and the concavely curved yarn cooling plate may extend substantially downwardly, starting approximately at the height of the end of the yarn heating plate, and both may extend over the service aisle in the shape of a curved roof.

The yarn heating plate and/or the yarn cooling plates have an outwardly and upwardly curved concave shape when viewed from the service aisle and jointly extend over the service aisle in the shape of a curved roof. To facilitate the periodically necessary maintenance work in cleaning the yarn guideways, the outwardly curved cooling plate and/or the outwardly curved yarn heating plate may be supported for pivotal movement in the plane of the yarn path about pivot points positioned in the end areas of the plates.

An advantageous arrangement is provided particularly for high yarn speeds in which the yarn heating plate is arranged upright and adjacent the yarn supply creel and wherein the yarn cooling plate include two sections. The yarn cooling plate sections extend over the service aisle substantially in the shape of a curved roof and are interconnected by a yarn deflector. At least one of the two sections may be convex. To facilitate the necessary maintenance work, each convexly shaped yarn cooling plate section is supported for rotation in the plane of the yarn path and about an axis located in the area of its upper end.

In a further embodiment of the false twist crimping machine of the present invention, the yarn heating plate is arranged on or adjacent to the yarn supply creel and substantially rises therefrom, being preferably curved inwardly toward the service aisle. Advantageously, the inlet end of the yarn cooling plate is located substantially in the vicinity of and aligned with the outlet end of the yarn heating plate. The yarn cooling plate extends in an outwardly vaulted curve from the exit end of the yarn heating plate to the central frame of the machine substantially in the area of the false twisting unit. A particularly favorable arrangement results when the inlet end of the yarn cooling plate is so disposed that it is substantially aligned with the outlet end of the yarn heater plate so that the yarn advances from the yarn heater plate to the yarn cooling plate and from the yarn cooling plate to the false twist unit without a deflection except for that resulting from the curvature of the yarn cooling plate. If the outlet end of the yarn cooling plate is so arranged that it is substantially aligned with the yarn path into the false twist unit, the yarn will also advance from the yarn cooling plate into the false twist unit without a deflection. In this manner, it is insured that a smooth passage of the yarn occurs from the yarn cooling plate to the false twist unit.

The necessary maintenance work may be facilitated by forming the cooling plate in a pair of substantially equally long sections which are aligned with each other as precisely as possible at their common separating point. At least one section, and preferably both sections, are supported for rotation in the yarn path plane about pivot points provided on their lower ends.

BRIEF DESCRIPTION OF THE DRAWINGS

Other objects and advantages of the present invention will appear as the description proceeds when taken in connection with the accompanying drawings, in which—

DESCRIPTION OF THE PREFERRED EMBODIMENTS

Figure 1:
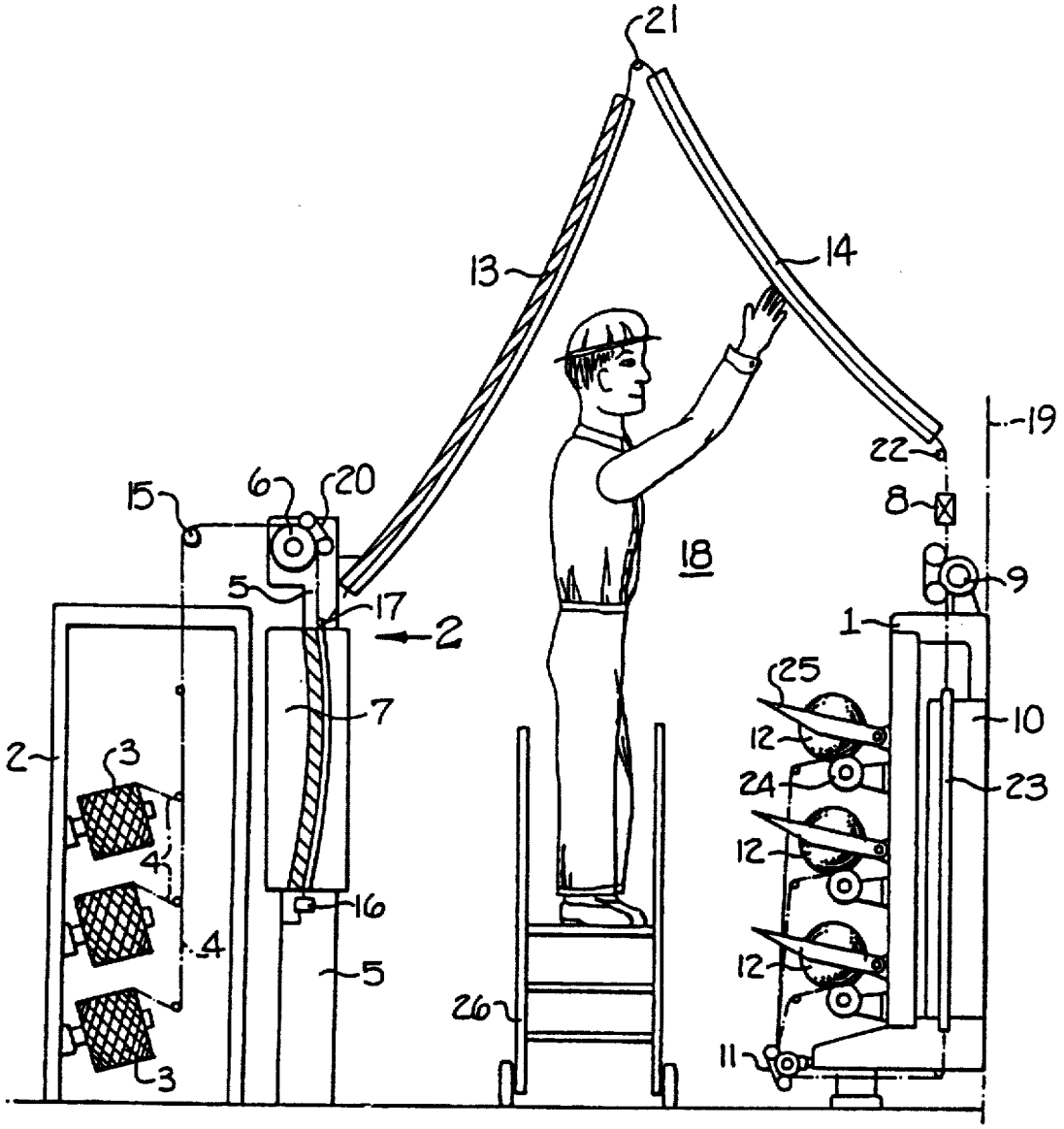
FIG. 1 is a cross-sectional view of one-half of a false twist crimping machine and illustrating one embodiment of the thermal treatment apparatus of the present invention.

The embodiment of the yarn false twist crimping machine illustrated in cross section in FIG. 1 includes a central machine frame 1 which is cut longitudinally along a central plane of symmetry, indicated by the dash-dot line 19. All machine parts described on this half of the machine frame are also present in a mirror-inverted manner on the other side of the plane of symmetry 19. The machine central frame 1 has a longitudinal front which extends parallel to the plane of symmetry 19. Distributed in spaced-apart relationship along this longitudinal front are adjacent yarn processing stations including parts to be described, with all of the spaced-apart yarn processing stations corresponding to the cross-sectional plane illustrated in FIG. 1. The crimping machine also includes a side frame 5 which extends in parallel relationship and laterally spaced from the longitudinal machine front to provide a service aisle 18 therebetween. The side frame 5 includes a yarn creel 2 which is illustrated as an elongate frame in FIG. 1, but it is to be understood that the creel may be in the form of individual, tower-like rotatable frames, such as disclosed in U.S. Pat. No. 4,572,458.

A number of yarn take-off supply packages 3 are supported on the creel 2 and from which the yarns to be processed are unwound. The yarn, indicated at 4, unwinds from each supply package 3 and passes through suitable yarn guides to an additional yarn deflecting yarn guide 15. The withdrawn yarns 4 are spaced apart in the longitudinal direction of the machine as they are drawn upwardly so that they advance at spaced-apart parallel distances relative to each other. While the path of only one individual yarn 4 is described, it is to be understood that the same description also applies to the other yarns.

From the deflecting yarn guide 15, each yarn 4 passes through a first yarn feed device 6. The device 6 is supported on the upper portion of the supporting side frame 5, which is positioned at one side of the service aisle 18 as noted above. A motor 6a (FIG. 2) drives the first yarn feed device 6 at a constant speed. The yarn 4 passes around the first yarn feed device 6 and is pressed thereagainst by a nipping apron 20 so that the yarn extends approximately 90 degrees around and over the first yarn feed device 6. Such a yarn feed device 6 is conventional and is disclosed, for example, in British Pat. No. 1,414,276.

Figure 2:
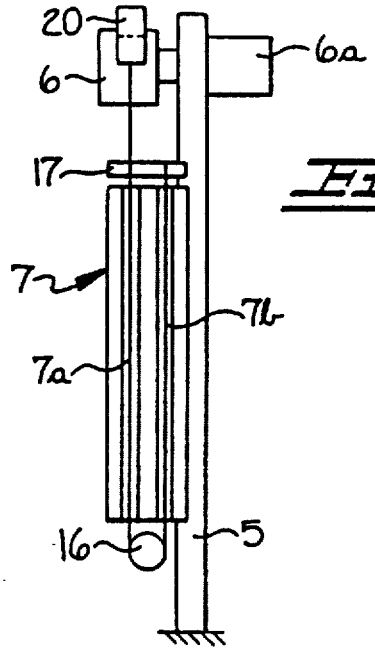
FIG. 2 is an enlarged fragmentary elevational view of the yarn heating means supported adjacent the creel in FIG. 1, and taken in the direction of the arrow II.

The yarn 4 then contacts a yarn heating means 7 supported on the support frame 5. As best seen in FIG. 2, the yarn heating means 7 is positioned below the first yarn feeding device 6 and comprises a downwardly directed plate or guideway 7a having an upper inlet end adjacent the feeding device 6 for receiving the yarn, and a lower outlet end. The yarn heating means 7 also includes a deflecting yarn guide 16 adjacent the lower outlet end of the guideway 7a, and an upwardly directed plate or guideway 7b having an inlet end adjacent the guide 16. Thus the yarn advancing from the yarn feed device 6 is first guided downwardly and along the yarn guideway 7a, then deflected by 180 degrees passing beneath the yarn guide 16, and then again guided upwardly along the second yarn guideway 7b. By this arrangement, the effective heating length along the yarn path corresponds to twice the height of the yarn heating means 7. The yarn heating means 7 thus includes two elongated, metallic yarn contact surfaces or guideways which are parallel to each other and preferably curved inwardly, as indicated in FIG. 1. The radii of the curvature of the yarn guideways is preferably relatively small, for example, about ten meters or less, and most preferably, above seven meters or less. The yarn heating means 7 may also be in the form of a hollow metal box, on the surface of which the hot plates are formed with yarn guideways. Alternatively, metal plates may be clamped on the box. The hollow box may be filled with a fluid, for example, water, biphenyl (Dowtherm), which is heated and the vapors of which transfer their vaporization heat to the cold places of the wall and condense in so doing. Such heating systems are disclosed, for example, in U.S. Pat. No. 4,001,548.

The yarn 4 is deflected at about 60 degrees obliquely upwardly at the outlet end of the yarn heating means 7 by a defecting yarn guide 17. The yarn 4 then moves into contact with the inlet end of a yarn cooling means which includes an upwardly inclined first portion or section 13 and a downwardly inclined second portion or section 14. Each section of the yarn cooling means is preferably a metal plate which is cooled by recirculated air and provided with a suitable yarn guide groove. The upper end portions of both sections 13 and 14 are interconnected by a yarn deflecting guide 21. Both sections 13 and 14 are inwardly curved with the radius of curvature preferably being short and measuring, for example, about 8 meters or less.

Adjacent the outlet end of the cooling plate section 14, the yarn 4 passes over a deflecting yarn guide 22 and into a false twist unit 8. The yarn 4 then advances to a second yarn feed device 9 with the yarn guide 22 and the false twist unit 8 being located in substantial alignment below the second deflecting yarn guide 22 on the machine frame 1. A second yarn heating box 10 may be arranged below the second yarn feed device 9 and is illustrated as including a plurality of tubes 23 extending therethrough. The yarn 4 is guided through the tube 23 which is heated on its exterior. To this end, the heating box 10 may also be closed and partially filled with a fluid which is heated and transfers its vaporization heat to the tubes 23. Below the tube 23, the yarn 4 is again deflected toward the machine front to a third yarn feed device 11. It is to be understood that the heating box 10 and the third feed system 11 may be eliminated or [bypasses] *bypassed*, which is done in the production of highly elastic yarns. In any event, each yarn 4 is finally wound on one of the take-up systems 12. Each take-up system 12 is schematically illustrated and comprises, as is well known, a drive roll 24, which is driven at a constant circumferential speed, a traversing yarn guide system, not shown, and a take-up package arm 25 which is provided to pivotally support the take-up package 12 in circumferential contact with the drive roll 24. A buggy 26 may be provided and moved along the service aisle 18 so that an operator may step up on it for threading the yarn and cleaning the contact surfaces or yarn guide grooves of the yarn cooling plates 13, 14.

The embodiment illustrated in FIG. 1 provides an improved thermal treatment apparatus including a yarn heating means 7 and a yarn cooling means provided by upwardly and downwardly extending yarn cooling plate sections 13, 14. In order to obtain a greater yearn heating length, the yarn 4 is reciprocated or passed downwardly and then upwardly along the yarn guideways 7a and 7b on the yarn heating means 7. In order to obtain a greater yarn cooling length, the cooling plate sections 13, 14 extend over the service aisle 18 in a peaked roof-like manner. Also, the inwardly curved cooling plate sections 13, 14 insure a reliable and effective contact of the advancing yarn with the cooling plates sections 13, 14.

Figure 3:
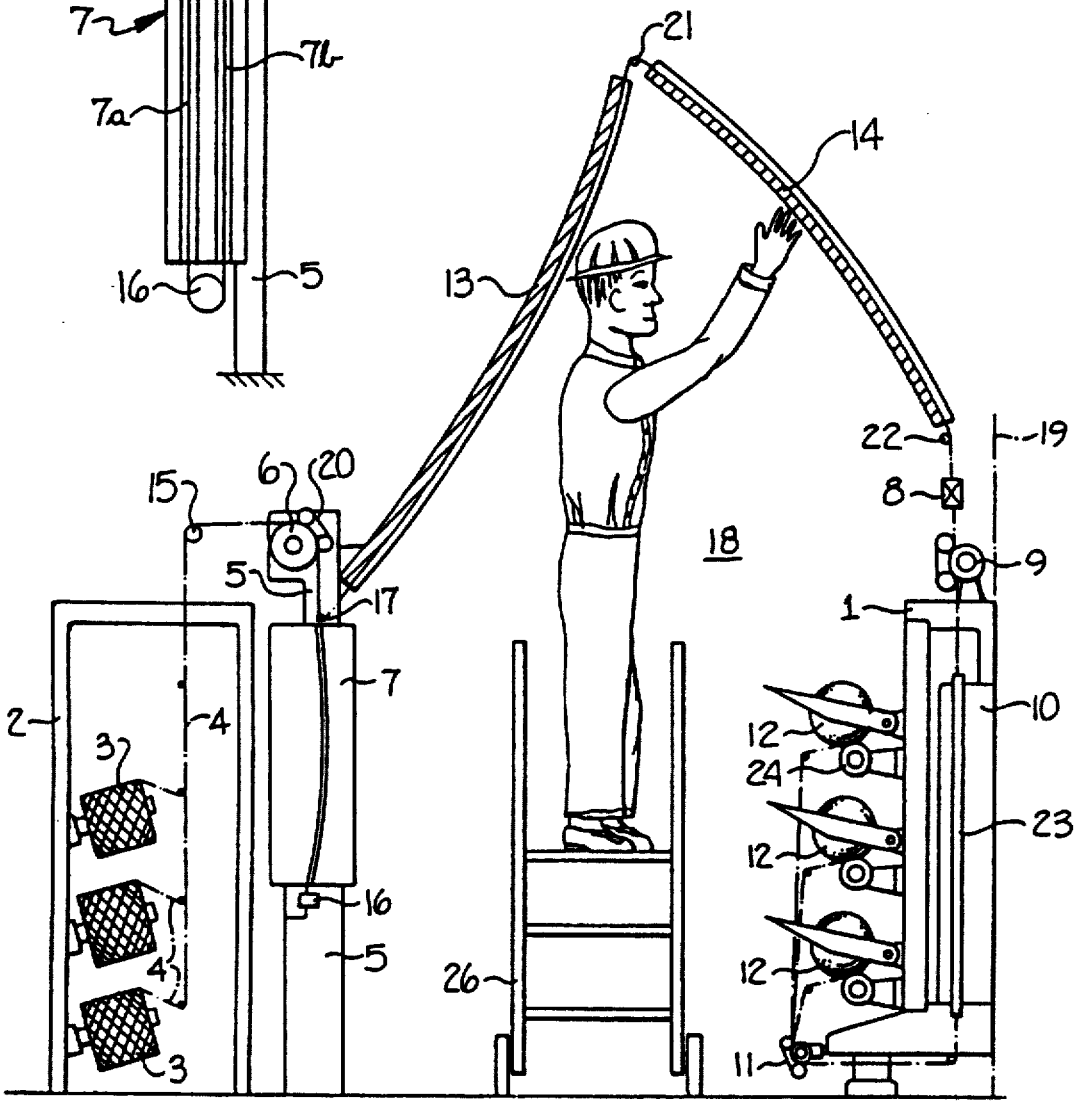
FIG. 3 is a view similar to FIG. 1 but illustrating another embodiment of the thermal treatment apparatus in accordance with the present invention.

The parts of the embodiment of FIG. 3 correspond to the parts of the embodiment of FIG. 1 and bear like reference characters. However, it should be noted that the two sections 13, 14 of the cooling means in the embodiment of FIG. 1 are curved inwardly in a convex manner relative to the service aisle 18 and the yarn guideways face inwardly toward the service aisle. This arrangement has the advantage that the operator can see the yarn guideways from the operating aisle, can thread the yarn from this side and can clean the yarn guideways from the service aisle. On the other hand, this arrangement has a disadvantage in that the yarn is deflected at the deflecting point 21 at a very sharp or large angle so that a high yarn friction can develop at this deflecting point 21. The looping angles of the yarn on each section 13, 14 of the cooling means provide a high total looping angle at which the yarn has to pass over the deflecting yarn guide 21, which angle is much greater than if the cooling plate sections 13, 14 were straight.

In the embodiment of FIG. 3, the cooling plate section 14 is outwardly or concavely curved relative to the service aisle 18 and the yarn guideway or groove faces away from the service aisle 18. While this arrangement is a disadvantage to the operator, the angle of deflection of the yarn on the yarn guides 21 and 22 is smaller in FIG. 3 than the corresponding angle of deflection in FIG. 1. Since the yarn cooling plate section 14 is bowed or curved outwardly, the overall looping angle on the deflecting yarn guides 21 and 22, and on the cooling plate section 14 is somewhat less than the overall looping angle would be if the yarn were guided in a straight line between the deflecting yarn guides 21 and 22.

It is to be understood that the first cooling section 13 of the cooling means could also be arranged to curve outwardly so as to further reduce the looping angle of the yarn on the deflecting yarn guides 17 and 21. The false twist unit 8 can be of any suitable construction and examples of false twist units are disclosed in U.S. Pat. Nos. 3,813,868 and 4,389,841.

In both the embodiments of FIG. 1 and FIG. 3, it is to be understood that the cooling plate sections 13, 14 may be of different or of the same length. The angle between the cooling plate sections 13, 14 may be obtuse with a relatively short cooling length and may be acute, as illustrated, with a greater cooling length. In any event, it is significant that the two sections 13, 14 extend over the service aisle 18 in a two-sided arrangement in the manner of a peaked roof.

Figure 4:
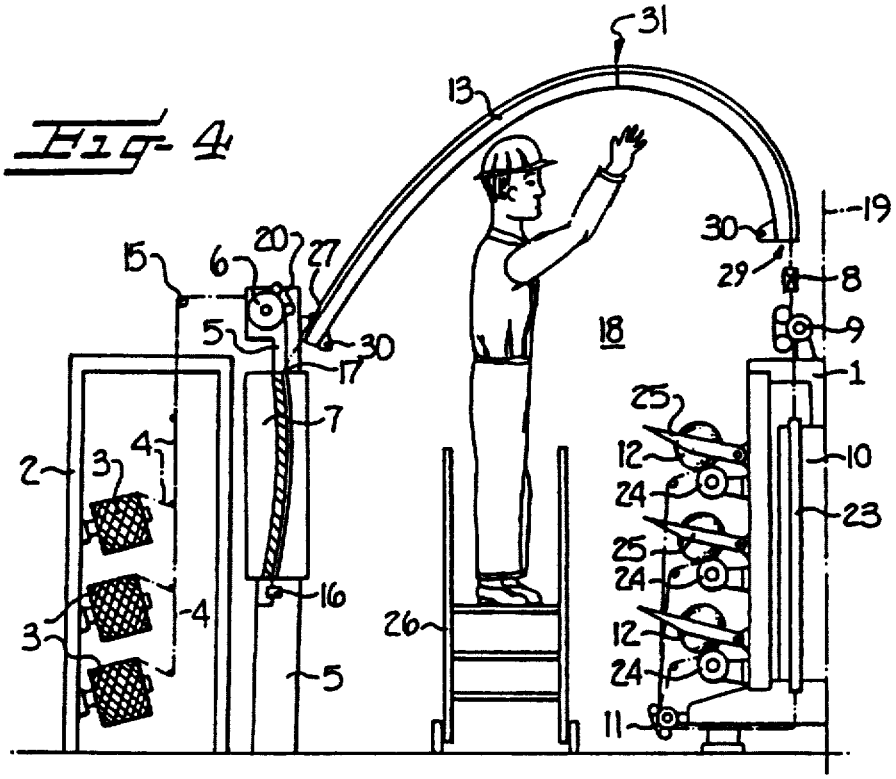
FIG. 4 is a view similar to FIG. 1 but showing another embodiment of the thermal treatment apparatus of the present invention.

Many of the parts of the embodiment of FIG. 4 are identical to corresponding parts of the embodiments of FIGS. 1 and 3 and the same reference characters will be applied to the corresponding parts. In FIG. 4, the cooling plate sections 13, 14 are joined together at their upper free ends, as indicated at 31, to provide one single piece which is arcuately and outwardly curved. The yarn guide grooves face the outside and away from the service aisle 18. The curvature is so selected that the cooling plate sections 13, 14 extend over the service aisle in the shape of a vault or cupola with the curvature of the cooling plate section 13 being less in the area of the yarn inlet than in the area of the cooling plate section 14 at the yarn outlet. This curvature results in the yarn tensions being considerably reduced in the inlet area, in which the yarn is still warm or hot, and also the usual tension force at which the yarn contacts the cooling plate section 13 is decreased. The radii of the cooling plate sections 13 and 14 should be less than six times their length, and preferably are less than four times their length.

Figure 5:
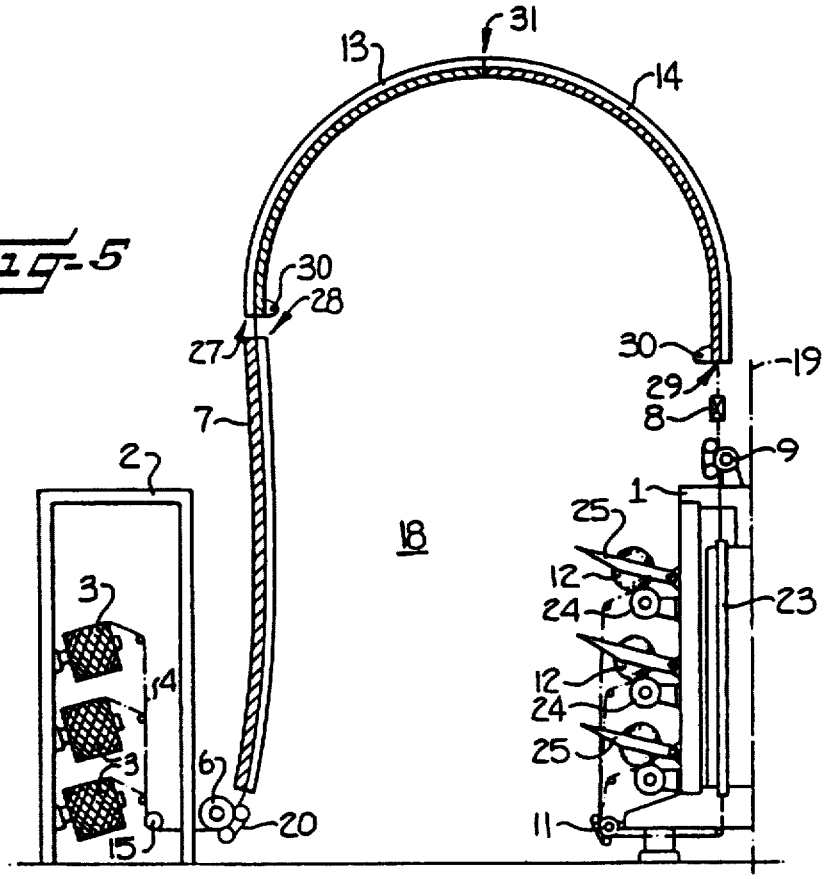
FIG. 5 is a view similar to FIG. 1 but illustrating yet another embodiment of the thermal treatment apparatus, and wherein the cooling plate extends over the service aisle in the shape of a cupola.

FIG. 5 illustrates a configuration of the yarn heating means 7 and the cooling plate sections 13, 14 which is particularly advantageous for use in high speed yarn processing. In this embodiment, the first yarn feeding device 6 is positioned and supported closely adjacent the lower end of the yarn supply creel 2 and the yarn heating means is in the form of an elongate plate 7 which extends upwardly with a curvature directed inwardly toward the service aisle 18.. The outlet end 28 of the yarn heating plate 7 is spaced slightly apart from the inlet end 27 of the cooling plate section 13. It is preferred that the heating plate outlet end 28 be aligned with the inlet end 27 of the yarn cooling plate section 13 so that the yarn 4 is not deflected as it advances from the yarn heating plate 7 to the cooling plate section 13. As noted, the yarn guide groove in the yarn heating plate 7 faces inwardly toward the service aisle 18. The cooling plate section 13 continues to extend arcuately upwardly and then across the service aisle 18 and the joined cooling plate section 14 continues to curve downwardly to a point immediately in advance of the false twist unit 8 supported on the machine front. In this arrangement, the outlet end 29 of the cooling plate section 14 is preferably so aligned that the direction of the yarn path into the false twist unit 8 is tangent to the outlet end 29 of the cooling plate section 14. In both the cooling plate sections 13, 14 of FIG. 5, the yarn guide grooves face outwardly or away from the service aisle 18. Also, the radii of curvature of the sections 13, 14 should be less than six times their length, and preferably less than four times their length.

While the outwardly and upward curvature of the cooling plates 13, 14 of FIGS. 4 and 5 has considerable advantages for the yarn guidance, this arrangement may complicate their maintenance. To facilitate maintenance of the yarn cooling sections 13, 14, the lower end portions of the yarn cooling sections 13, 14 are supported on pivot pins, as illustrated at 30, so that the upper end portions of the yarn cooling plates 13, 14 can be lowered into the service aisle for cleaning and the like. When in the operating position, as shown in FIGS. 4 and 5, the adjacent ends of the cooling plate sections 13, 14 abut each other, as illustrated by the separating point 31, which is illustrated as being positioned at the approximate center or at the highest point of the arc described by the cooling plate sections 13, 14.

Figure 6:
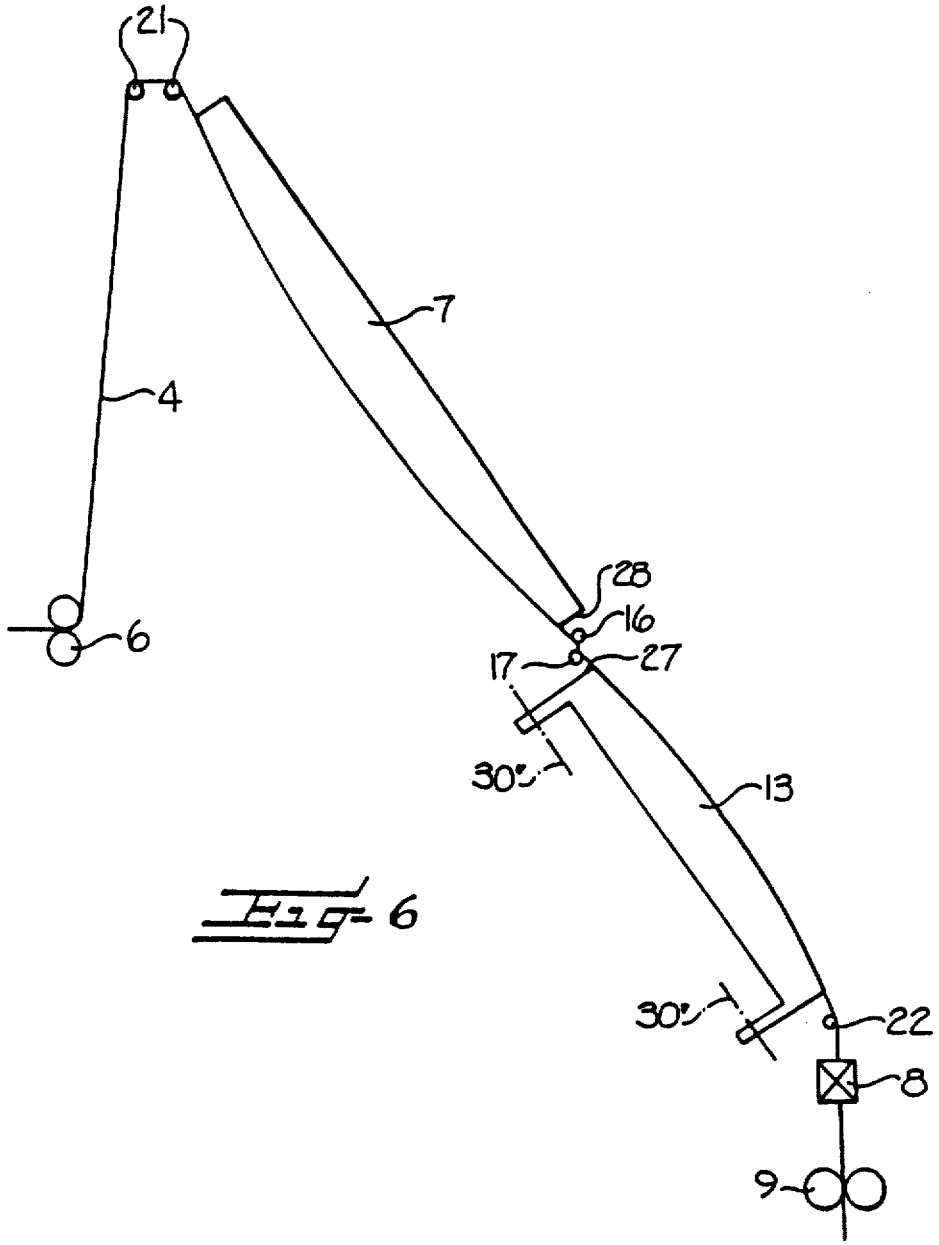
FIG. 6 is a somewhat schematic view of an arrangement of the yarn heating and cooling plates providing very little overall deflection of the yarn path passing over the yarn heating plate, the yarn cooling plate, and into the false twist unit.

Another embodiment of the [htermal] *thermal* treatment zone is schematically illustrated in FIG. 6 wherein yarn deflection means in the form of two deflectors 21 is positioned above the first yarn feeding means 6. The inlet end of the yarn heating plate 7 is adjacent the deflectors 21, and the outlet end 28 of the yarn heating plate 7 is aligned with the inlet end 27 of the yarn cooling plate 13 so that a very small overall deflection of the yarn takes place as the yarn 4 passes along the yarn heating plate 7 and the yarn cooling plate 13 and around the guide 22 to be fed into the false twist unit 8. More particularly, the yarn heating plate 7 and the yarn cooling plate 13 are generally aligned along a straight line extending between the deflectors 21 and a position immediately above the false twist unit 8. The yarn heating plate is inwardly curved along its length and includes a yarn guideway along its inner surface. The cooling plate 13 is outwardly curved along its length and includes a yarn guideway along its outer surface.

In FIG. 6, the yarn 4 advances from the first feed device 6 upwardly to the highest point of the yarn path where it is deflected over two yarn deflectors 21 onto the yarn guideway of the yarn heating plate 7. Since the yarn 4 is still unheated at this point and a return of the false twist beyond the heater plate entrance is not necessary because the tension in the yarn 4 has practically the lowest value, which occurs along the false twist path between the feed systems 6 and 9, the relatively great deflectdion on the deflecting guides 21 does not provide a substantial disadvantage. During the false twist travel along the path with the yarn in contact with the yarn heating plate 7 and the yarn cooling plate 13, the deflection is very small and practically depends only on the extent of the curvature of the yarn heating plate and the yarn cooling plate 13. A last deflection of the yarn 4 leaving the yarn cooling plate 13 occurs prior to its entry into the false twist unit 8 and on the yarn guide 22, which deflects the yarn 4 to the central rotational axis of the false twist unit 8. To facilitate cleaning of the upwardly curved contact surface of the cooling plate 13, which faces away from the service aisle 18, the cooling plate 13 can be pivoted adjacent its opposite ends on pivot axes 30' extending parallel to the longitudinal yarn path along the cooling plate 13, so that the contact surface or yarn guideway may be easily reached from the service aisle 18.

Figure 7:
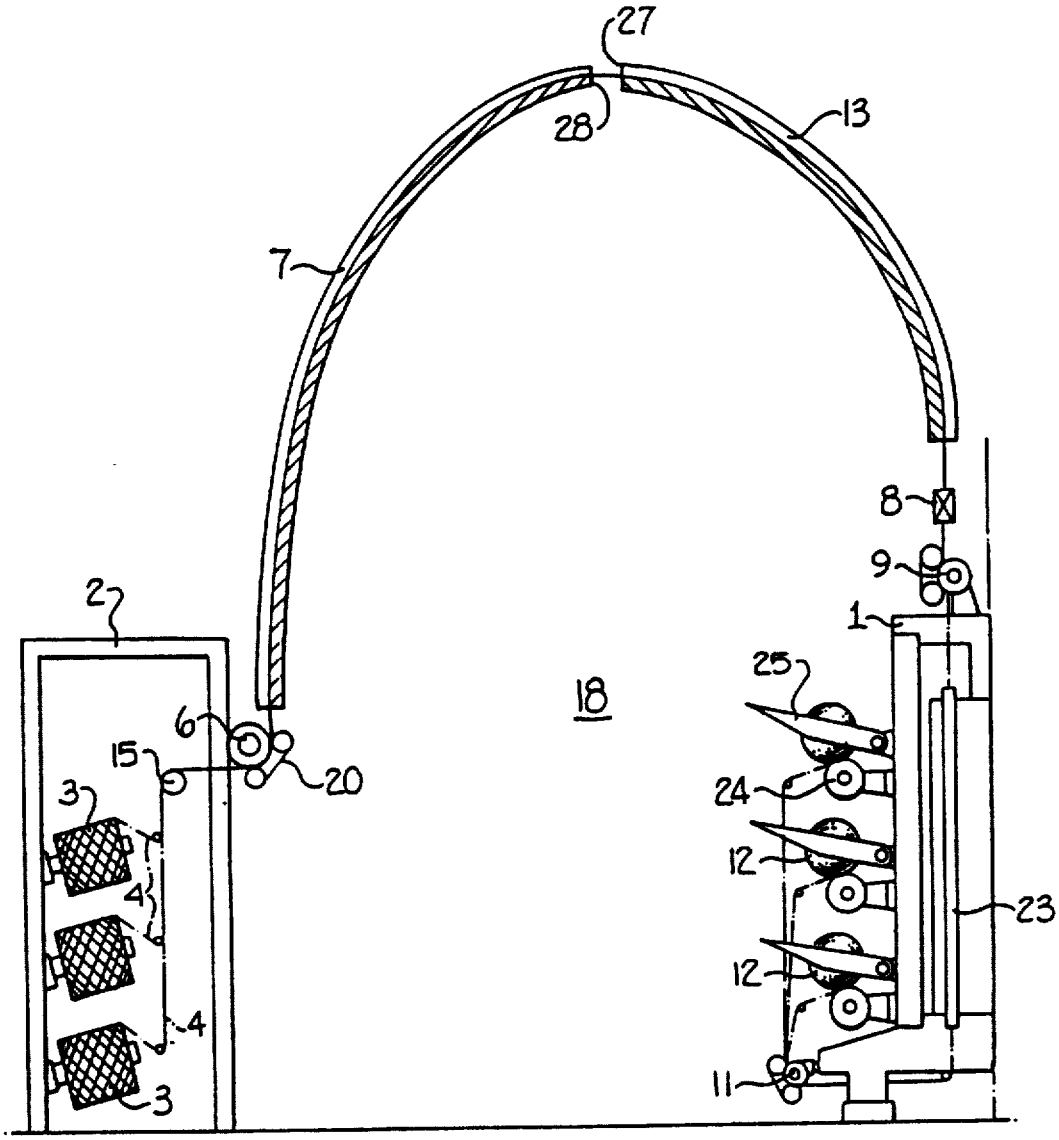
FIG. 7 is a view similar to FIG. 1 but illustrating still another embodiment of the thermal treatment zone with an ascending yarn heating plate and a substantially descending yarn cooling plate.

In the embodiment of FIG. 7, the yarn feeding means is positioned adjacent the upper portion of the side frame, and the yarn heating plate 7 extends arcuately upwardly to a mid-point above the service aisle. both the yarn heating plate 7 and the yarn cooling plate 13 have an outwardly and upwardly curved shape when viewed from the service aisle 18. The radius of the heater plate 7 of this embodiment should be between twenty and five meters, and preferably ten plus or minus two meters. The radius of the cooling plate 13 should be less than six times its length, and preferably less than four times its length. In this arrangement, the outlet end 28 of the yarn heating plate 7 and the inlet end 27 of the yarn cooling plate 13 are aligned with each other at the mid-point above the aisle. Also, the yarn 4 advances without deflection from the yarn heating plate 7 to the yarn cooling plate 13, which both together extend over the service aisle 18 substantially in the form of a curved roof. To facilitate the periodically necessary maintenance work, the outwardly curved yarn heater plate 7 and the outwardly curved yarn cooling plates 13 may be supported for rotation in the plane of the yarn path about an axis, not shown, which is provided in the upper ends of the yarn heating plate 7 and the yarn cooling plate 13 so that the outwardly facing yarn guideways can be easily reached from the service aisle 18.

In the drawings and specifications there has been set forth the best modes presently contemplated for the practice of the present invention, and although specific terms are employed, they are used in a generic and descriptive sense only and not for purposes of limitation, the scope of the invention being defined in the claims.

I claim:

1. A yarn false twist crimping machine for processing synthetic yarn comprising a central frame, a side frame laterally spaced from said central frame and defining a service aisle therebetween, [and with said side frame being adapted for mounting yarn bobbins thereon,]

first yarn feeding means mounted to said side frame, yarn heating means positioned adjacent said side frame and below said first yarn feeding means and including a downwardly directed guideway having an inlet end for receiving the yarn from said first yarn feeding means and an outlet end, a deflecting yarn guide adjacent said outlet end, and an upwardly directed guideway having an inlet end adjacent said deflecting yarn guide and an outlet end, yarn cooling means having an inlet end adjacent said outlet end of said upwardly directed guideway and an outlet end, and with said yarn cooling means extending across and above said service aisle, yarn false twisting means mounted to said central frame for receiving yarn from said outlet end of said yarn cooling means, and winding means mounted to said central frame for winding the processed yarn.

2. The yarn false twist crimping machine as defined in claim 1 further comprising a second yarn feeding means mounted on said central frame for feeding yarn from said yarn false twisting means to said winding means.

3. The yarn false twist crimping machine as defined in claim 2 further comprising a second yarn heating means mounted to said central frame and between said false twisting means and said winding means.

4. The yarn false twist crimping machine as defined in claim 1 wherein said downwardly directed guideway and said upwardly directed guideway are each arcuately curved along its length in a direction inwardly toward [siad] *said* service aisle.

5. The yarn false twist crimping machine as defined in claim 1 wherein said yarn cooling means comprises two distinct sections which extend across and above said service aisle in the manner of a peaked roof.

6. The yarn false twist crimping machine as defined as claim 5 wherein said two sections of said yarn cooling means are each arcuately curved along its length and are disposed at an angle with respect to each other, and further comprising yarn guide means positioned between the two sections of said yarn cooling means.

7. The yarn false twist crimping machine as defined in claim 1 wherein said yarn cooling means is arcuately curved along its length so as to form an upwardly vaulted segment which extends completely across said service aisle, and wherein said yarn cooling means includes a yarn guideway which faces away from said service aisle.

8. The yarn false twist crimping machine as defined in claim 7 wherein said yarn cooling means comprises two sections having upper ends which are aligned with each other, and wherein at least one of said sections is mounted for rotation in the plane of the yarn path.

9. The yarn false twist crimping machine as defined in claim 7 wherein the degree of curvature of said yarn cooling means is greater along the portion adjacent said central frame than along the portion adjacent said side frame.

10. A yarn false twist crimping machine for processing synthetic yarn comprising a central frame, a side frame laterally spaced from said central frame and defining a service aisle therebetween, [and with said side frame being adapted for mounting yarn bobbins thereon,]

first yarn feeding means mounted to said side frame, yarn thermal treatment means including yarn heating means and yarn cooling means, with said yarn heating means and said yarn cooling means each having an inlet and an outlet end, and with said inlet end of said yarn heating means being positioned adjacent said first yarn feeding means and with said inlet end of said yarn cooling means being positioned adjacent and in alignment with said outlet end of said yarn heating means, and with at least that portion of said yarn treatment means which includes said yarn cooling means being arcuately curved along its length so as to form an upwardly vaulted segment which extends across and above said service aisle, yarn false twisting means mounted to said central frame for receiving yarn from said outlet end of said yarn cooling means, and winding means mounted to said central frame for winding the processed yarn.

11. The yarn false twisting crimping machine as defined in claim 10 wherein said first yarn feed means is positioned adjacent the lower portion of said side fame, and wherein said yarn heating means extends upwardly in a generally vertical direction [and includes an outlet end].

12. The yarn false twist crimping machine as defined in claim 11 wherein said yarn cooling means comprises two aligned sections which are arcuately curved and extend across and above said service aisle.

13. The yarn false twist crimping machine as defined in claim 12 wherein said yarn cooling means includes a yarn guideway which faces away from said service aisle, and wherein each of said two sections is mounted for pivotal movement in the plane of the yarn path to facilitate cleaning of the yarn guideway.

14. The yarn false twist crimping machine as defined in claim 10 wherein said yarn feeding means is positioned adjacent the upper portion of said side frame, and wherein said yarn heating means extends arcuately upwardly to a mid-point above said service aisle, and said yarn cooling means extends arcuately downwardly from said mid-point to a position above said yarn false twisting means.

15. The yarn false twist crimping machine as defined in claim 14 wherein said yarn heating means and said yarn cooling means each include a yarn guideway which faces away from said service aisle.

16. A yarn false twist crimping machine for processing synthetic yarn comprising a central frame, a side frame laterally spaced from said central frame and defining a service aisle therebetween, [and with said side frame being adapted for mounting yarn bobbins thereon,]

yarn thermal treatment means extending in an inclined, relatively straight direction and across said service aisle, and including a yarn heating plate having an inlet end above said side frame and an outlet end, and a yarn cooling plate having an inlet end adjacent and aligned with said outlet end of said yarn heating means and an outlet end above said [yarn false twisting means] *central frame*, with one of said plates being outwardly curved along its length and including a yarn guideway along its outer surface, and means for pivotally mounting said one plate for rotation about a pivotal axis to facilitate cleaning of said guideway, yarn false twisting means mounted to said central frame, yarn guide means for guiding [the] *an* advancing yarn from said side frame to said inlet end of said yarn heating plate and from said outlet end of said yarn cooling plate to said yarn false twisting means, and winding means mounted to said central frame for winding the processed yarn.

17. The yarn false twist crimping machine as defined in claim 16 wherein the other of said yarn heating plate and said yarn cooling plate is inwardly curved along its length and includes a yarn guideway along its inner surface.

18. The yarn false twist crimping machine as defined in claim 17 wherein said one plate comprises said yarn cooling plate, and wherein said pivotal axis is parallel to the yarn path along said yarn cooling plate.

19. A yarn false twist crimping machine for processing synthetic yarn comprising a central frame, a side frame laterally spaced from said central frame and defining a service aisle therebetween, [and with said side frame being adapted for mounting yarn bobbins thereon,]

first yarn feeding means mounted to said side frame, yarn deflecting means positioned above said first yarn feeding means for guiding the yarn upwardly from said yarn feeding means, yarn thermal treatment means extending downwardly and across said service aisle from said yarn deflecting means, and including yarn heating means having an inlet end adjacent said yarn deflecting means and an outlet end, and yarn cooling means having an inlet end adjacent and aligned with said outlet end of said yarn heating means and an outlet end adjacent said [yarn false twisting means] *central frame*, with said yarn cooling means being outwardly [curvged] *curved* along its length and including a yarn guideway along its outer surface, and means for pivotally mounting said yarn cooling means for rotation about a pivotal axis to facilitate cleaning of said guideway, yarn false twisting means mounted to said central frame for receiving yarn from said outlet end of said yarn cooling means, and winding means mounted to said central frame for winding the processed yarn.

20. The yarn false twist crimping machine as defined in claim 19 wherein said yarn heating means is inwardly curved along its length and includes a yarn guideway along its inner surface.

21. The yarn false twist crimping machine as defined in claim 20 wherein said yarn heating means and said yarn cooling means are generally aligned along a straight line extending between said yarn deflecting means and a position immediately above said yarn false twisting means.

22. The yarn false twist crimping machine as defined in claim 21 wherein said pivotal axis is parallel to the yarn path along said yarn cooling means.

*23. The yarn false twist crimping machine as defined in claim 1, wherein said yarn cooling means comprises two sections having upper ends which are adjacent each other, and wherein at least one of said sections is arcuately curved along its length, so as to form an upwardly vaulted segment including a yarn guideway which faces away from said service aisle.*

*24. The yarn false twist crimping machine as defined in claim 23, wherein the other of said two sections is arcuately curved along its length in a direction inwardly toward said service aisle, and includes a yarn guideway facing toward said service aisle.*

*25. The yarn false twist crimping machine as defined in claim 10, wherein said yarn cooling means includes a yarn guideway which faces away from said service aisle.*

*26. The yarn false twist crimping machine as defined in claim 10, wherein said yarn heating means extends from said side frame arcuately upwardly to a location above said service aisle and said yarn cooling means extends arcuately downwardly from said location to a position above said yarn false twisting means.*

*27. A yarn false twist crimping machine for processing synthetic yarn comprising*

*a central frame,*

*a side frame laterally spaced from said central frame and defining a service aisle therebetween,*

*yarn feeding means mounted to said side frame,*

*yarn thermal treatment means having at least a portion thereof extending across and above said service aisle and including yarn heating means and yarn cooling means, with said yarn heating means and said yarn cooling means each having an inlet end and an outlet end, and with said inlet end of said yarn heating means being positioned adjacent said yarn feeding means and with said inlet end of said yarn cooling means being positioned adjacent said outlet end of said yarn heating means, and with at least one of said yarn heating means and said yarn cooling means being arcuately curved along its length so as to form an upwardly vaulted segment which is located above and extends at least substantially across said service aisle in the general form of a curved roof,*

*yarn false twisting means mounted to said central frame for receiving yarn from said outlet end of said yarn cooling means, and*

*winding means mounted to said central frame for winding the processed yarn.*

*28. The yarn false twist crimping machine as defined in claim 27 wherein said one of said yarn heating means and*

*said yarn cooling means includes a yarn guideway which faces away from said service aisle.*

*29. The yarn false twist crimping apparatus as defined in claim 27 wherein both said yarn heating means and said yarn cooling means are arcuately curved along their length so as to form said upwardly vaulted segment, and with said yarn heating means extending arcuately upwardly to a location above said service aisle, and said yarn cooling means extending arcuately downwardly from said location to a position above said yarn false twisting means.*

*30. The yarn false twist crimping machine as defined in claim 29 wherein said yarn heating means and said yarn cooling means each include a yarn guideway which faces away from said service aisle.*

*31. The yarn false twist crimping machine as defined in claim 30 wherein the radius of curvature of said yarn heating means is between about five and twenty meters and the radius of curvature of said yarn cooling means is less than about six times its length.*

*32. The yarn false twist crimping machine as defined in claim 27 wherein said yarn heating means extends upwardly in a generally vertical direction, and said yarn cooling means comprises two aligned sections which are arcuately curved and extend across and above said service aisle, and wherein said yarn cooling means includes a yarn guideway which faces away from said service aisle.*

* * * * *